United States Patent [19]

Mannheimer

[11] Patent Number: 6,063,312
[45] Date of Patent: *May 16, 2000

[54] METHOD OF INCREASING THE RELATIVE HEAT CAPACITY OF A PUMPABLE DIELECTRIC HEAT TRANSFER CARRIER LIQUID

[75] Inventor: Richard J. Mannheimer, San Antonio, Tex.

[73] Assignee: Southwest Research Institute, San Antonio, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/605,680

[22] Filed: Feb. 22, 1996

Related U.S. Application Data

[63] Continuation of application No. 08/014,186, Feb. 5, 1993, abandoned.

[51] Int. Cl.[7] .................. H01B 3/20; C09K 3/18
[52] U.S. Cl. .................. 252/572; 252/574; 252/578; 252/70; 428/212; 427/402
[58] Field of Search .............. 252/70, 570, 574, 252/572, 578; 165/53, 10, 104.7, 104.11; 428/212; 427/402

[56] References Cited

U.S. PATENT DOCUMENTS

| | | | |
|---|---|---|---|
| 3,596,713 | 8/1971 | Katz | 165/104.17 |
| 4,221,259 | 9/1980 | Ronc et al. | 165/1 |
| 4,237,023 | 12/1980 | Johnson et al. | |
| 4,259,401 | 3/1981 | Chahroudi et al. | |
| 4,273,100 | 6/1981 | Cogliano | |
| 4,287,076 | 9/1981 | Babin et al. | |
| 4,292,189 | 9/1981 | Chen | |
| 4,708,812 | 11/1987 | Hatfield | 252/70 |
| 4,715,987 | 12/1987 | Yano et al. | |
| 4,793,402 | 12/1988 | Yano et al. | |
| 4,825,939 | 5/1989 | Salyer et al. | |
| 4,908,166 | 3/1990 | Salyer | |
| 5,053,446 | 10/1991 | Salyer | 524/8 |
| 5,106,520 | 4/1992 | Salyer | |
| 5,282,994 | 2/1994 | Salyer | 252/70 |
| 5,387,370 | 2/1995 | Tomizawa et al. | 252/299.01 |

OTHER PUBLICATIONS

Journal of the American Society of Lubrication Engineers "Polyalphaolefins as Candidate Replacements to Silicate Ester Dielectric Coolants in Military Applications", May 1984.

*Primary Examiner*—Necholus Ogden
*Attorney, Agent, or Firm*—Madan & Morris, PC

[57] ABSTRACT

A pumpable heat transfer composition comprising a carrier liquid, a phase change material insoluble in the carrier liquid, and a solid microporous structure. The invention also comprises the method of making this composition.

4 Claims, No Drawings

METHOD OF INCREASING THE RELATIVE HEAT CAPACITY OF A PUMPABLE DIELECTRIC HEAT TRANSFER CARRIER LIQUID

This application is a continuation of application Ser. No. 08/014,186, filed Feb. 5, 1993, now abandoned.

BACKGROUND OF THE INVENTION

The present invention relates to pumpable heat transfer compositions and to the method of making the same.

It is known to utilize heat transfer compositions for a wide variety of purposes, primarily as coolants as well as in other areas in order to increase the potential benefits from solar energy and waste heat collection. There are a number of materials that have been utilized for this purpose with those having the highest heat capacities and heat transfer coefficients being those most suitable for this purpose. Examples of heat such known transfer materials utilized are water, certain glycols, fluorinated hydrocarbons, and the like. For certain uses, such as military applications, where it is desired to use dielectric coolants in aircraft radar and missile systems and other avionic components, it has long been known to utilize silicate-ester based coolants and more recently the readily available hydrogenated polyalphaolefin (PAO) based fluids. However, even the PAO's do not have a satisfactorily high heat capacity and heat transfer coefficient. Attempts to add a phase change material (PCM) thereto in order to increase the heat capacity and heat transfer coefficient of the PAO's have not been successful.

One cannot utilize any PCM soluble in the PAO, such as a paraffin, since it will solidify the entire composition and the use of an insoluble PCM will solidify in the heat rejector and plug up the flow lines.

Efforts to overcome some of these problems have included encapsulating the PCM's. Use of PCM's, soluble in the PAO, is not satisfactory since the PCM and PAO being soluble in each other diffuse through the capsule shell and one then has the same problems as before. Capsules also have a tendency to rupture due to, at least, thermal cycling and pumping. The resultant capsule breakage and the loss of the PCM will degrade the thermal properties of the heat transfer composition, thus, vitiating the beneficial effects of the PCM. Thus, even if an insoluble PCM is utilized, capsule breakage will also eliminate its beneficial effects.

SUMMARY OF THE INVENTION

A novel heat transfer composition has now been found which overcomes the problems of the prior art.

Briefly stated, the present invention comprises a pumpable heat transfer composition comprising a carrier liquid, a phase change material insoluble in said carrier liquid, and a solid microporous structure preferentially wet by the liquid phase change material. Preferably, the phase change material is absorbed in the solid microporous structure before being admixed with the carrier liquid.

The invention also the method of making the composition as hereinafter set forth.

DETAILED DESCRIPTION

While the pumpable composition of the present invention can be utilized for a wide variety of uses such as for solar energy capture and waste-heat collection, it will be more particularly described with respect to dielectric coolants in military applications.

As used herein, the term "carrier liquid" refers to the PAO and the fact that the said solids, such as the microporous structure and capsules, if used, are suspended therein.

Also, although a wide variety of dielectric heat transfer compositions can be utilized such as the silicate ester fluids, hydrogenated polyalphaolefin-based fluids (PAO's), and the others noted above, the invention will be described in connection with the PAO's. In like manner, in describing the phase change material, it will be clear that a wide variety of polar phase change compounds can be utilized, such as polyoxyethylene stearates, polyoxyethylene lauryl ethers, polyoxyethylene cetyl ethers, polyoxyethylene stearyl ethers, polyethylene glycols, mixtures thereof and the like, but the invention will be particularly described with respect to the use of a polyethylene glycol and the polyoxyethylene stearate which are preferred.

As to the polyethylene glycol utilized, it can have molecular weights ranging from as low as 300 to as high as 5,000, or mixtures thereof, either with other polyethylene glycols or with water. The particular composition will depend on the approximate melting point desired for the particular PCM and the properties desired of the heat transfer composition. Table I forth below shows various blends of polyethylene glycol with the numeral following the PEG standing for the molecular weight of the material and the resultant approximate melting point.

TABLE I

| PEG COMBINATIONS | | APPROXIMATE MELTING POINT |
| --- | --- | --- |
| 50% PEG 300 | 50% PEG 1000 | 31–33° C. |
| 50% PEG 300 | 50% PEG 3350 | 47–52° C. |
| 70% PEG 300 | 30% PEG 4600 | 47–50° C. |
| 75% PEG 3500 | 25% WATER | 30° C. |

As to proportions, the amount of PCM added is that desired or necessary to obtain the requisite heat transfer characteristics. The optimum amount can be determined by routine experimentation. It has been found that ordinarily 10% to 50% by volume of the pumpable heat transfer composition can be the PCM.

In the event an aqueous coolant is to be used, the microporous structure must be treated with a coupling agent to preferentially make it oil-wet or to use microporous structures that are initially preferentially oil-wet such as Cab-o-Sil 610 sold by Cabot and PCM's must be used that are insoluble in water, such as normal paraffins.

A preferred first step in utilizing the phase change material is to have it absorbed in a solid microporous structure. It is preferred to utilize amorphous silica, usually aggregates of extremely small particles, of about 0.02 microns. Such silica aggregates have internal porosities or voids close to 80% of the total volume of the amorphous silica.

Other materials that can be used in place of the amorphous silica are aluminosilicates, zeolites and molecular sieves. As used herein the term "molecular sieves" refers to microporous structures composed of either crystalline aluminosilicates, chemically similar to clays and a feldspars and belonging to a class known as zeolites, or crystalline aluminophosphates derived from mixtures containing an organic amine or quaternary ammonium salts. The pore sizes of these materials vary widely usually in the Angstrom range with again the channels therein comprising up to 50% of the total volume of the material utilized.

For the most effective use of the PCM in the instant invention all that is required is to admix the requisite amount of PCM with the minimum amount of the solid microporous material capable of absorbing the PCM. That is to say, if one is to utilize a certain volume of the PCM material for any given PAO, it is only necessary to add that amount to the amount of solid microporous material that can absorb the same. The necessary amounts of microporous material needed to absorb the requisite amount of PCM for any given PCM and microporous material can be readily determined by routine experiementation involving mixing differing amounts of the microporous materials with the PCM. It is preferred to heat the mixture above the melting point of the PCM to ensure absorption.

After the PCM has been absorbed, the resultant dry material, the solid micoporous structure having absorbed in the pores thereof the liquid PCM, is then added to the PAO in the amounts necessary to give the desired heat transfer characteristics; i.e., heat capacity and/or heat transfer coefficient. Larger increases in heat capacity and/or heat transfer coefficients and/or different operating temperatures for optimum performance can be accomplished in some instances by utilizing higher loadings of the PCM or utilizing PCM's with different melting points, the variations in the melting point have been described in Table I above.

Of significance with the instant invention is the fact even if the particular dielectric coolant is subjected to extensive cycling and pumping resulting in any mechanical fracturing of the microporous solids, there is no significant leakage of the liquid or solid PCM due to this breakage since the PCM is held in the internal pores of the solid agglomerates.

A further embodiment of the present invention is to utilize the capsules containing the PCM to form a slurry of the same in the PAO, but to add to the PAO-PCM mixture an amount of the solid microporous material capable of absorbing at least 50% and preferably 100% of the PCM utilized. In this way if there is any PCM released due to capsule breakage, before it can cause any blockage of flow lines downstream of the filter, it will be absorbed by the solid micropore structures. As has been noted the solid microporous structures used herein, namely amorphous silica or other like material described above, has a preferential wetability (attraction or affinity) for the PCM and even though initially saturated by the PAO, the PAO will be displaced by the PCM. It will be evident that any encapsulation procedure previously used to coat polar and non-polar PCM's can be used to encapsulate the polyethylene glycol or other polar PCM used herein.

The invention will be further described in connection with the following examples which are set forth for purposes of illustration only.

EXAMPLE 1

Heat capacity measurements were made of a polyalphaolefin, CASTROL BRAYCO MICRONIC 889 meeting MIL-C-87252 for coolant fluid, hydrolytically stable, dielectric. This PAO had a reported heat capacity of 0.48 Cal/g° C. at −40° C. and its heat capacity value at 150° C. is 0.65 Cal/g° C.

Polyethylene glycol having molecular weight of 900 was admixed with amorphous silica aggregates formed of 0.02 micron particles until it was absorbed in the amorphous silica. A slurry was formed by admixing 32.6 wt. % of the solid formed (22.5 weight percent of the polyethylene glycol absorbed in 10.1 weight % of the amorphous silica) with 67.4 weight percent of the PAO.

Heat capacity measurements were then made of the admixture described at various temperatures utilizing the test standard ASTM D 3947-86. The resultant relative heat capacities are set forth in Table II below.

TABLE II

| TABLE I, HEAT CAPACITY OF PCM SLURRY (22.5 WT %) RELATIVE TO PAO | |
|---|---|
| TEMPERATURE ° C. | RELATIVE HEAT CAPACITY |
| 24 | 1.10 |
| 26 | 1.65 |
| 28 | 2.14 |
| 30 | 2.86 |
| 32 | 1.94 |
| 34 | 0.95 |

It will immediately be seen that the solid phase PCM composition of the present invention increased the heat capacity of the PAO by almost 200% at a temperature of 30° C. and somewhat less at lower and higher temperatures that encompass the melting point range; i.e, 26 to 32° C.

It is important to note that much higher increases in heat capacity can be obtained if a PCM with a much narrower melting point range is used since heat capacity is defined as the amount of heat absorbed per degree change in temperature per unit weight of material.

EXAMPLE 2

The procedure of Example 1 was with the exception that a polyoxyethylene stearate (MYRJ 59 by ICI) was subsituted for the PEG in an amount of 30 wt. % thereof, 15 wt. % amorphous silica, and 55 wt. % PAO.

The amount of heat absorbed by melting and heat rejected by solidification of the slurry and polyoxyethylene stearate alone, were measured by differential scanning colorimetry (DSC). The measurements showed there was essentially no difference in the melting and freezing curves for these two materials except that proportionally smaller amounts of heat were absorbed and rejected for the slurry because of the smaller amounts of PCM. In particular, the heat of melting for the pure PCM was 39.3 cal/g and 11.0 cal/g the slurry. These measurements demonstrate (possibly for the first time) that micro PCM's can be made to work in PAO.

It is believed that the slight lowering of the melting and solidification temperatures can be caused by "free water" in the amorphous silica that could be removed by heating the silica to 105° C. before adding the PCM. Similarly, the smaller amount of heat rejected by both the bulk PCM and the absorbed PCM is due to super cooling, which could be eliminated by the addition of nucleating agents or by the use of PCM's that do not have this problem. It is important to note that the electrical properties of this slurry were measured and were found to exceed MIL-C-87252 specifications.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of increasing the relative heat capacity of a pumpable dielectric heat transfer carrier liquid comprising adding thereto a solid microporous structure containing therein a phase change material, wherein said carrier liquid is a polyalphaolefin and said solid microporous structure is an amorphous silica, a zeolite, a crystalline aluminophosphate, an aluminosilicate, or mixtures thereof, wherein said phase change material is encapsulated before being admixed with said carrier liquid.

2. A method of increasing the relative heat capacity of a pumpable dielectric heat transfer carrier liquid comprising adding thereto a solid microporous structure containing therein a phase change material, wherein said carrier liquid is a polyalphaolefin, said solid microporous structure is an amorphous silica, a zeolite, a crystalline aluminophosphate, an aluminosilicate, or mixtures thereof, and said phase change material is first absorbed in said solid structure then admixed with said carrier liquid.

3. The method of claim 1 wherein said phase change material is a polyoxyethylene stearate, polyoxyethylene lauryl ether, polyoxyethylene cetyl ether, polyoxyethylene stearyl ether, polyethylene glycol, a mixture of polyethylene glycols, a mixture of a polyethylene glycol and water, or mixtures thereof.

4. The method of claim 2 wherein said phase change material is a polyoxyethylene stearate, polyoxyethylene lauryl ether, polyoxyethylene cetyl ether, polyoxyethylene stearyl ether, polyethylene glycol, a mixture of polyethylene glycols, a mixture of a polyethylene glycol and water, or mixtures thereof.

* * * * *